United States Patent
Heo

(10) Patent No.: US 8,465,034 B2
(45) Date of Patent: Jun. 18, 2013

(54) RACK BAR SUPPORTING DEVICE OF STEERING APPARATUS FOR VEHICLE

(75) Inventor: Sung-moo Heo, Wonju-si (KR)

(73) Assignee: Mando Corporation, Pyeongtaek-Si (KR)

(*) Notice: Subject to any disclaimer, the term of this patent is extended or adjusted under 35 U.S.C. 154(b) by 144 days.

(21) Appl. No.: 13/022,163

(22) Filed: Feb. 7, 2011

(65) Prior Publication Data

US 2011/0193331 A1    Aug. 11, 2011

(30) Foreign Application Priority Data

Feb. 9, 2010   (KR) .................. 10-2010-0011886

(51) Int. Cl.
  *B62D 3/12*    (2006.01)
(52) U.S. Cl.
  USPC ............. 280/93.515; 280/779; 280/93.514; 74/388 PS; 74/422
(58) Field of Classification Search
  None
  See application file for complete search history.

(56) References Cited

U.S. PATENT DOCUMENTS

| | | | | |
|---|---|---|---|---|
| 4,619,155 A | * | 10/1986 | Futaba | 74/498 |
| 5,265,691 A | * | 11/1993 | Konishi et al. | 180/400 |
| 6,119,540 A | * | 9/2000 | Phillips | 74/422 |
| 7,210,368 B2 | * | 5/2007 | Odenthal et al. | 74/422 |
| 7,487,984 B1 | * | 2/2009 | Lemont et al. | 280/93.514 |
| 8,079,280 B2 | * | 12/2011 | Kubota et al. | 74/422 |
| 8,256,315 B2 | * | 9/2012 | Song | 74/422 |
| 2003/0074996 A1 | * | 4/2003 | Camp | 74/422 |
| 2007/0209463 A1 | * | 9/2007 | Song et al. | 74/388 PS |
| 2008/0006110 A1 | * | 1/2008 | Douma et al. | 74/422 |
| 2008/0006111 A1 | * | 1/2008 | Douma et al. | 74/422 |
| 2008/0202271 A1 | * | 8/2008 | Heo | 74/422 |
| 2009/0223314 A1 | * | 9/2009 | Eickholt | 74/422 |
| 2009/0249902 A1 | * | 10/2009 | Rombold et al. | 74/29 |
| 2010/0018337 A1 | * | 1/2010 | Kawakubo et al. | 74/422 |
| 2010/0024583 A1 | * | 2/2010 | Kawakubo et al. | 74/422 |

* cited by examiner

*Primary Examiner* — Paul N Dickson
*Assistant Examiner* — James English
(74) *Attorney, Agent, or Firm* — McDermott Will & Emery LLP

(57) ABSTRACT

Disclosed is a rack bar supporting device of a rack and pinion type steering apparatus for a vehicle. The disclosed device can prevent free movement from increasing by automatically adjusting a predetermined free movement even when wear occurs in a support yoke after degradation of driving durability of the vehicle, and can prevent a noise from occurring caused by an increase of free movement when the support yoke collides with a yoke plug by an impact reversely input from an uneven road surface, etc. This can provide a comfortable steering feeling to the driver.

4 Claims, 11 Drawing Sheets

RACK BAR SUPPORTING DEVICE OF STEERING APPARATUS FOR VEHICLE

CROSS-REFERENCE TO RELATED APPLICATION

This application claims priority from and the benefit under 35 U.S.C. §19(a) of Korean Patent Application No. 10-2010-0011886, filed on Feb. 9, 2010, which is hereby incorporated by reference for all purposes as if fully set forth herein.

BACKGROUND OF THE INVENTION

1. Field of the invention

The present invention relates to a rack bar supporting device of a steering apparatus for a vehicle. More particularly, the present invention relates to a rack bar supporting device of a rack and pinion type steering apparatus for a vehicle, which can prevent free movement from increasing by automatically adjusting a predetermined free movement even when wear occurs in a support yoke after degradation of driving durability of the vehicle, and can prevent a noise from occurring caused by an increase of free movement when the support yoke collides with a yoke plug by an impact reversely input from an uneven road surface, etc.

2. Description of the Prior Art

In general, a steering apparatus is an apparatus which allows a driver to freely change an advancing direction of a vehicle. In other words, the apparatus is an assist apparatus which allows a driver to freely change a rotation center of turning of a front wheel of the vehicle and to advance the vehicle in a required direction.

FIG. 1 is a schematic configuration view illustrating a conventional rack and pinion type steering apparatus.

As shown, the conventional rack and pinion type steering apparatus includes: a steering wheel 100 disposed in a driver's seat; a steering shaft 105 connected to the steering wheel 100; a steering column 103 configured to fix the steering shaft to a vehicle body; a gear box 130 including a rack gear 110 and a pinion gear 120 which convert a rotation force received from the steering shaft 105 into a linear motion; a rack bar 140 provided with inner ball joints 135 at both ends thereof, and a tie rod 150 integratedly formed with a ball of each of the inner ball joints 135.

Also, the tie rod 150 is connected to an outer ball joint 155 and transfers a force to a knuckle 159, so as to steer a tire 158.

FIG. 2 is a cross-sectional view illustrating a conventional rack bar supporting device.

As shown, the conventional rack bar supporting device includes a pinion gear 120, a rack bar 140, a support yoke 260, a spring 263, and a yoke plug 265. A rack and pinion type gear box 130, as described above, converts a rotation force received from a steering shaft (not shown) into a linear motion.

The rack bar 140 converts a rotary motion into a linear motion by meshing with the pinion gear 120. At the rear surface of the rack bar 140, a device for supporting the rack bar 140 toward the pinion gear 120 is provided so as to facilitate the mesh of the rack bar 140 and the pinion gear 120.

The device for the rack bar 140 includes the support yoke 260, the spring 263, and the yoke plug 265. The support yoke 260 is positioned at the opposite side to the formation surface of the rack gear 110 (see FIG. 1) as the rear surface of the rack bar 140, and has a structure in which it can move in front/rear directions perpendicular to the rack bar 140 by being inserted in a cylinder 250 of the gear box 130.

The support yoke 260 has a cylindrical shape so that it can slide in the front/rear directions within the cylinder 250. Also, at the support yoke 260's front side contacting with the rack bar 140, a semicircular groove is formed so as to closely contact with the rear surface of the rack bar 140.

Also, at the rear side of the support yoke 260, the spring 263 is disposed so that the rack bar 140 and the pinion gear 120 can closely contact with each other and effectively transfer a force. The spring 263 pushes the support yoke 260 at a predetermined pressure so as to compensate free-movement occurring between the rack bar 140 and the pinion gear 120.

The support yoke 260 as described above slidingly rubs against the rear surface of the rack bar 140. Thus, in order to prevent the rack bar 140 from being worn or a noise from occurring by friction, the support yoke 260 is made of a plastic material softer than the conventional rack bar 140.

The spring 263 received in a spring groove 220 has a function of pressing the support yoke 260 in such a manner that the support yoke 260 can closely contact with the rack bar 140. In general, as the spring 263, a coil spring is used. At the rear surface of the spring 263, the yoke plug 265 is positioned so as to support the spring 263.

The yoke plug 265 supports the spring 263 in such a manner that the spring 263 can press the support yoke 260. In the yoke plug 265, in general, a screw thread and a screw groove are formed so that they can couple with the gear box 130 and a lock nut 240, the gear box 130 and the lock nut 240 being formed with another screw thread and another screw groove to mesh with them. At the rear surface of the yoke plug 265, a tool groove 230 into which a wrench can be inserted is formed.

However, the conventional rack bar supporting device as described above has a problem in that due to high friction, as the support yoke is worn to some extent, it cannot sufficiently support the rack bar by an increase of free movement. Furthermore, there is a problem in that due to the increase of free movement, a rattle noise occurs in the support yoke and the yoke plug.

In the conventional rack bar supporting device as described above, there is a problem in that when the durability of the support yoke contacting with and supporting the rack bar is degraded to some extent, the rattle noise occurring by free movement due to wear and the insufficient supporting of the rack bar reduce the stability of steering.

Also, when free movement occurs by the wear of the support yoke, the displacement of the spring coupled to compensate free movement increases by the increased free movement. This reduces tension of the spring. Thus, there is a structural problem in that even though the same impulse is added, the noise is increased.

SUMMARY OF THE INVENTION

Accordingly, the present invention has been made to solve the above-mentioned problems occurring in the prior art, and the present invention provides a rack bar supporting device of a steering apparatus for a vehicle, which can prevent free movement from increasing by automatically adjusting a predetermined free movement even when wear occurs in a support yoke after degradation of driving durability of a vehicle, and can prevent a noise from occurring caused by an increase of free movement when the support yoke collides with a yoke plug by an impact reversely input from an uneven road surface, etc.

In accordance with an aspect of the present invention, there is provided a rack bar supporting device of a steering apparatus for a vehicle, the rack bar supporting device including:

a support yoke inserted in a cylinder of a gear box, which has a front side surface closely supporting a rear surface of a rack bar, and a rear side surface formed with a slant surface symmetrical to a central axis surface; sliders formed with slant surfaces corresponding to the slant surface of the support yoke at a front side of the sliders, wherein the sliders are separately formed symmetrically to the central axis surface, and support the support yoke in a front direction by an elastic force of radial-directionally supporting elastic supports coupled with separate surfaces of the sliders; and a yoke plug coupled with the cylinder of the gear box to support rear surfaces of the sliders in the front direction.

In accordance with another aspect of the present invention, there is provided a rack bar supporting device of a steering apparatus for a vehicle, the rack bar supporting device including: a support yoke inserted in a cylinder of a gear box, which has a front side surface closely supporting a rear surface of a rack bar; a cam block having a communicating hole formed in a center thereof, which has a front side surface closely contacting with the support yoke, and a rear side surface formed with a slant surface symmetrical to a central axis surface; sliders formed with slant surfaces corresponding to the slant surface of the cam block at a front side of the sliders, wherein the sliders are separately formed symmetrically to the central axis surface, and support the cam block in a front direction by an elastic force of radial-directionally supporting elastic supports coupled with separate surfaces of the sliders; a yoke plug coupled with the cylinder of the gear box to support rear surfaces of the sliders in the front direction, in which in a center of the yoke plug, a through hole corresponding to the communicating hole of the cam block is formed; a slider adjuster which is insertedly coupled in the communicating hole and the through hole, in such a manner that one side of the slider adjuster is supported by a front side of the cam block, and the other side is supported by a rear side of the yoke plug so as to adjust a radial directional position of the sliders.

In accordance with a further aspect of the present invention, there is provided a rack bar supporting device of a steering apparatus for a vehicle, the rack bar supporting device including: a support yoke inserted in a cylinder of a gear box, which has a front side surface closely supporting a rear surface of a rack bar; a cam block having a front side surface closely contacting with the support yoke, and a rear side surface formed with a slant surface symmetrical to a central axis surface, wherein in a center of the rear side surface of the cam block, an adjusting bolt for adjusting a radial directional position of sliders is formed, the adjusting bolt being supported by a rear side surface of a yoke plug and being coupled with an adjusting nut; sliders formed with slant surfaces corresponding to the slant surface of the cam block at a front side the sliders, wherein the sliders are separately formed symmetrically to the central axis surface, and support the cam block in a front direction by an elastic force of radial-directionally supporting elastic supports coupled with separate surfaces of the sliders; and a yoke plug coupled with the cylinder of the gear box to support rear surfaces of the sliders in the front direction, wherein in a center of the yoke plug, a through hole is formed, in which the adjusting bolt of the cam block is inserted.

In accordance with a yet further aspect of the present invention, there is provided a rack bar supporting device of a steering apparatus for a vehicle, the rack bar supporting device including: a support yoke inserted in a cylinder of a gear box, which has a front side surface closely supporting a rear surface of a rack bar; a cam block having a front side surface closely contacting with the support yoke, and a rear side surface formed with a slant surface symmetrical to a central axis surface, wherein in a center of the cam block, a communicating hole formed with a screw part is formed; sliders formed with slant surfaces corresponding to the slant surface of the cam block at a front side the sliders, wherein the sliders are separately formed symmetrically to the central axis surface, and support the cam block in a front direction by an elastic force of radial-directionally supporting elastic supports coupled with separate surfaces of the sliders; a yoke plug coupled with the cylinder of the gear box to support rear surfaces of the sliders in the front direction, wherein in a center of the yoke plug, a through hole is formed; and an adjusting bolt which supports a rear side surface of the yoke plug while being screw-coupled with the communicating hole of the cam block through the through hole.

The device according to the present invention can prevent free movement from increasing by automatically adjusting a predetermined free movement even when wear occurs in a support yoke after degradation of driving durability of a vehicle. Also, it is possible to prevent a noise from occurring caused by an increase of free movement when the support yoke collides with a yoke plug by an impact reversely input from an uneven road surface, etc. This provides a comfortable steering feeling to the driver.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
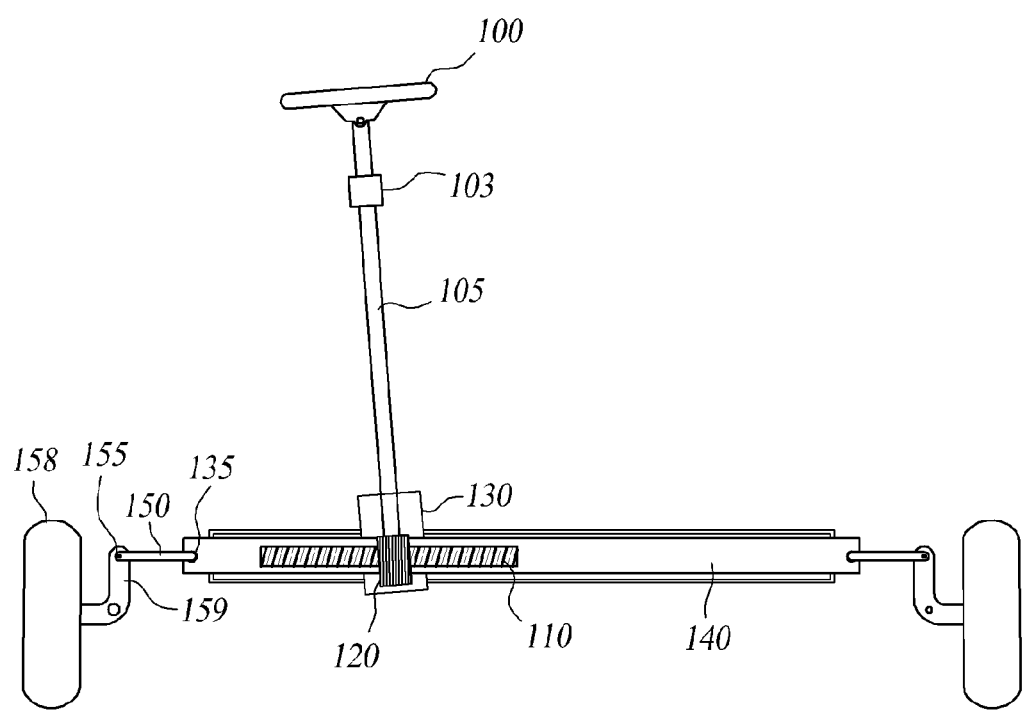
FIG. 1 is a schematic configuration view illustrating a conventional rack and pinion type steering apparatus for a vehicle.
Figure 2:
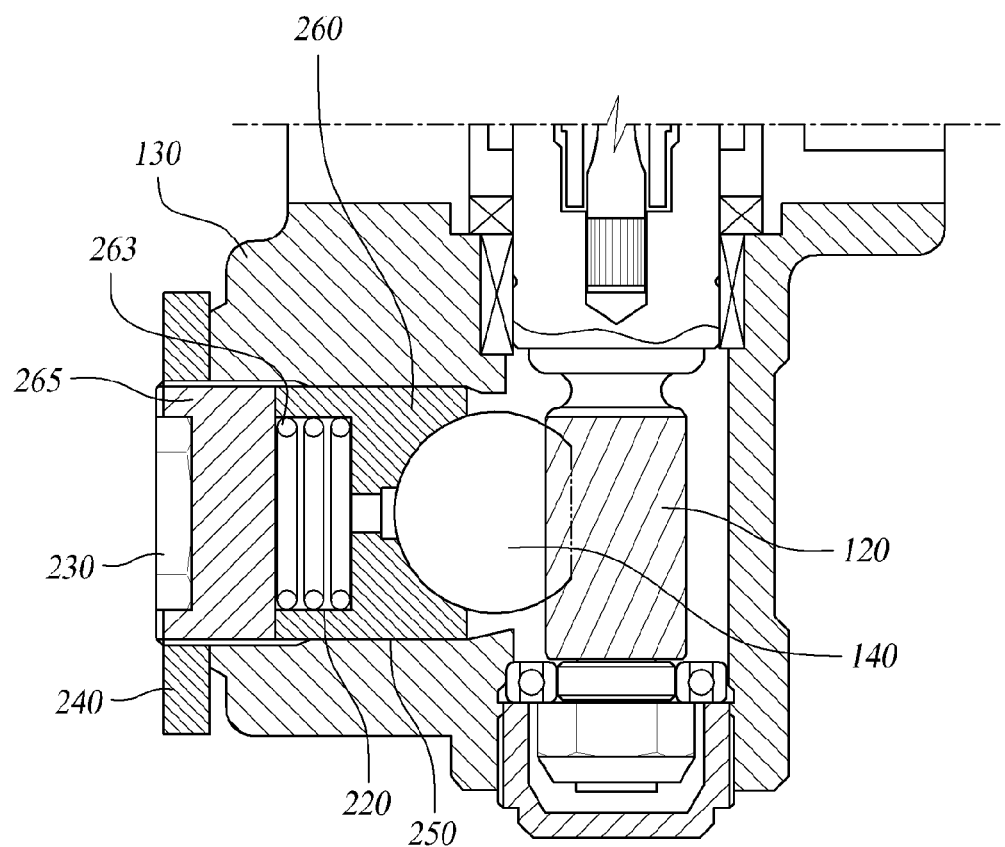
FIG. 2 is a cross-sectional view illustrating a conventional rack bar supporting device.

Hereinafter, exemplary embodiments of the present invention will be described in detail with reference to the accompanying drawings. In reference numerals given to components of respective drawings, it should be noticed that same components are designated by the same reference numerals as far as possible although they are illustrated in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

In the detailed description of the present invention, unless specially mentioned, for convenience of description, a direction of a rack bar, at the front side of a support yoke, is referred to as a front direction, and the opposite direction, at the rear side of the support yoke, is referred to as a rear direction.

Figure 3:
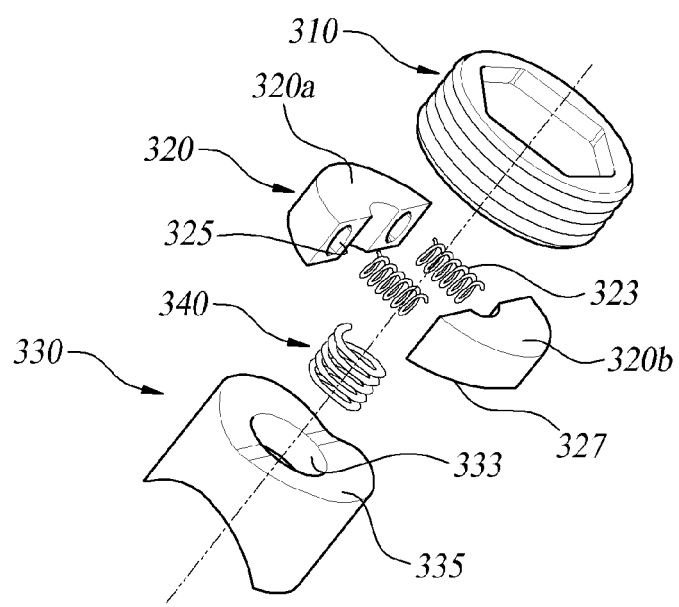
FIG. 3 is an exploded perspective view illustrating a rack bar supporting device for a vehicle, according to a first embodiment of the present invention.
Figure 4:
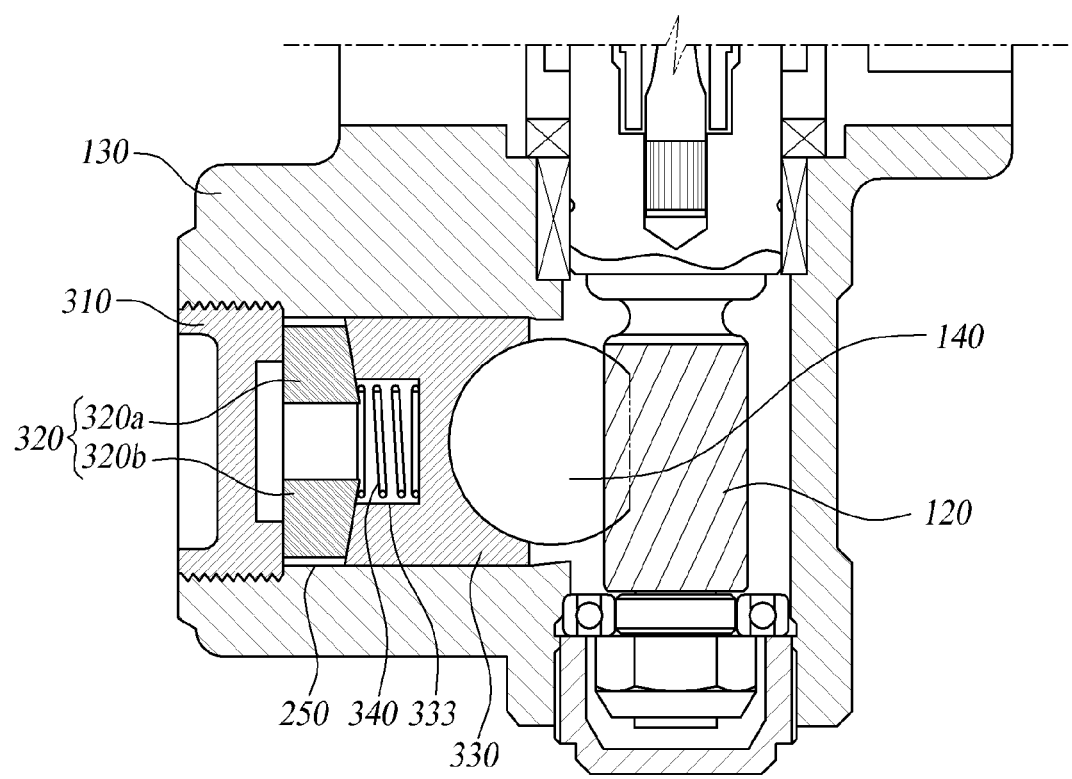
FIG. 4 is a cross-sectional view illustrating a rack bar supporting device for a vehicle, according to a first embodiment of the present invention.

FIG. 3 is an exploded perspective view illustrating a rack bar supporting device for a vehicle, according to a first embodiment of the present invention, and FIG. 4 is a cross-sectional view illustrating a rack bar supporting device for a vehicle, according to a first embodiment of the present invention.

As shown in FIGS. 3 and 4, a rack bar supporting device according to the first embodiment of the present invention includes: a support yoke 330 inserted in a cylinder 250 of a gear box 130, which has a front side surface closely supporting the rear surface of a rack bar 140, and a rear side surface formed with a slant surface 335 symmetrical to a central axis surface; sliders 320 formed with slant surfaces 327 corresponding to the slant surface 335 of the support yoke 330 at the front side thereof, wherein the sliders are separately formed symmetrically to the central axis surface, and support the support yoke 330 in the front direction by the elastic force of radial-directionally supporting elastic supports 323 coupled with the separate surfaces; and a yoke plug 310 coupled with the cylinder 250 of the gear box 130 to support the rear surfaces of the sliders 320 in the front direction.

The support yoke 330 closely contacts with the rear surface of the rack bar 140 meshing with a pinion gear 120, and supports the rack bar 140 in the front direction toward the pinion gear 120 so as to facilitate the mesh of the rack bar 140 and the pinion gear 120.

The support yoke 330 as described above allows the rack bar 140 to closely contact with the pinion gear 120 so as to effectively transfer a force, while the sliders 320 slid by the elastic supports 323 push the support yoke 330 in the front direction so that a predetermined free movement of the support yoke 330 and the rack bar 140 can be maintained, and then compensate the free movement occurring between the rack bar 140 and the pinion gear 120.

In other words, the support yoke 330 closely supports the rear surface of the rack bar 140 at the front side thereof by being inserted in the cylinder 250 of the gear box 130, and is formed with the convex or concave slant surface 335 symmetrical to the central axis surface at the rear side thereof in such a manner that the sliders 320 can push the support yoke 330 in the front direction by moving along the slant surface in a radial direction by the elastic supports 323.

Herein, the slant surface 335 has a center portion formed in a concave shape or a convex shape in such a manner that the sliders 320 can move in a radial direction along the slant surface 335 by the elastic supports 323.

Meanwhile, at the front side of the sliders 320, slant surfaces 327 are formed which correspond to the slant surface 335 of the support yoke 330 in such a manner that they can contact with the slant surface 335.

Such sliders 320 are both-sidedly separately formed symmetrically to the central axis surface. With the separated surfaces, the elastic supports 323 are coupled which support sliders 320a and 320b separated as described above in a radial direction.

Accordingly, the sliders 320a and 320b both-sidedly separately formed slide by an elastic force of the elastic supports 323, respectively, along the slant surface 335 of the support yoke 330 in a radial direction while supporting the support yoke 330 in the front direction.

In other words, when being subjected to a force by the elastic supports 323 in a radial direction, the separated sliders 320a and 320b slide toward the outer circumferential side along the slant surface 335 of the support yoke 330 and at the same time push the support yoke 330 in the front direction. This reduces free movement between the support yoke 330 and the rack bar 140.

In the separated surfaces of the sliders 320, radial-directional inside grooves 325, with which the elastic supports 323 are coupled, are formed. The elastic supports 323 are coupled with the inside grooves 325 without escape, while allowing a couple of separated sliders 320a and 320b to be slid along the slant surface of the support yoke 330 by applying an elastic force to the sliders 320a and 320b in a radial direction, that is, from the central axis to the outer circumferential direction.

In a case where the sliders 320 move in a radial direction by the elastic supports 323 in this manner, even when free movement increases by the friction between the support yoke 330 and the rack bar 140, the sliders 320 push the support yoke 330 toward the rack bar 140 at the front side by the increased extent. Thus, the free movement is uniformly maintained.

Also, between the rear surface of the support yoke 330 and the front surface of the sliders 320, a yoke spring 340 is coupled which supports the support yoke 330 in the front direction while absorbing the external impact transferred through the rack bar 140.

Also, at the rear surface of the support yoke 330, a spring groove 333 in which the yoke spring 340 is inserted is formed, the spring groove being configured to fix the yoke spring 340 without escape.

The yoke plug 310 is coupled with the cylinder 250 of the gear box while supporting the rear surface of the sliders 320.

Figure 5:
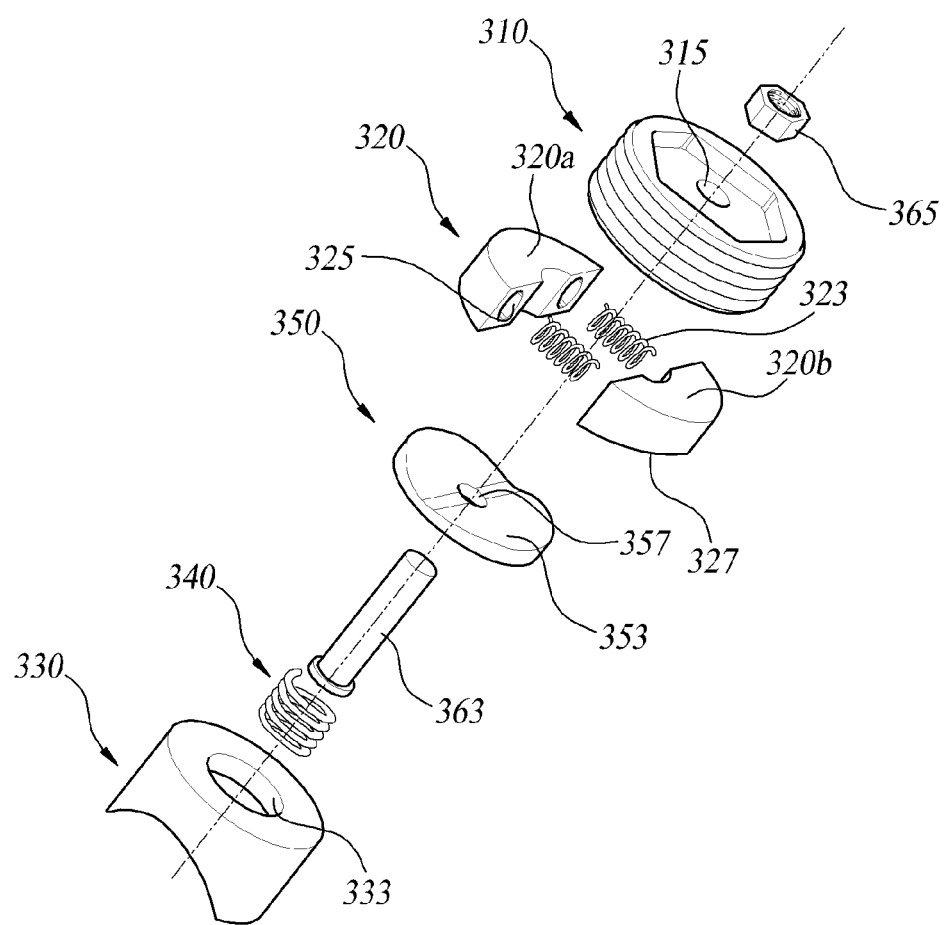
FIG. 5 is an exploded perspective view illustrating a rack bar supporting device for a vehicle, according to a second embodiment of the present invention.
Figure 6:
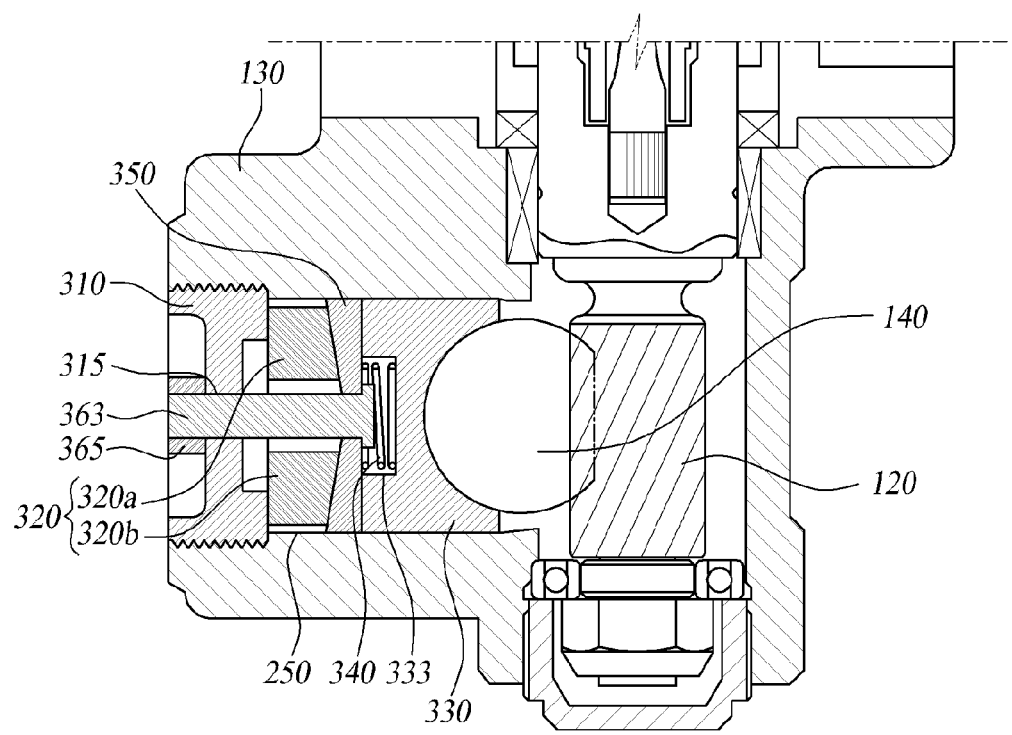
FIG. 6 is a cross-sectional view illustrating a rack bar supporting device for a vehicle, according to a second embodiment of the present invention.
Figure 7:
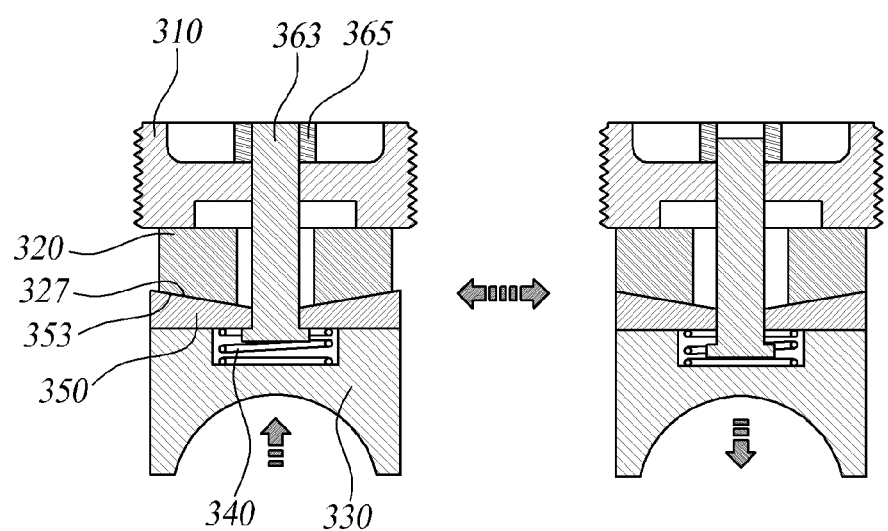
FIG. 7 is a cross-sectional view illustrating the operation state of a rack bar supporting device for a vehicle, according to a second embodiment of the present invention.

FIG. 5 is an exploded perspective view illustrating a rack bar supporting device for a vehicle, according to a second embodiment of the present invention, FIG. 6 is a cross-sectional view illustrating a rack bar supporting device for a vehicle, according to a second embodiment of the present invention, and FIG. 7 is a cross-sectional view illustrating the operation state of a rack bar supporting device for a vehicle, according to a second embodiment of the present invention.

As shown in the drawings, a rack bar supporting device according to the second embodiment of the present invention includes: a support yoke 330 inserted in a cylinder 250 of a gear box 130, which has a front side surface closely supporting the rear surface of a rack bar 140; a cam block 350 having a communicating hole 357 formed in the center thereof, which has a front side surface closely contacting with the support yoke 330, and a rear side surface formed with a slant surface 353 symmetrical to a central axis surface; sliders 320 formed with slant surfaces 327 corresponding to the slant surface 353 of the cam block 350 at the front side thereof, wherein the sliders are separately formed symmetrically to the central axis surface, and support the cam block 350 in the front direction by the elastic force of radial-directionally supporting elastic supports 323 coupled with the separate surfaces; a yoke plug 310 coupled with the cylinder 250 of the gear box 130 to support the rear surfaces of the sliders 320 in the front direction, in which in the center of the yoke plug, a through hole 315 corresponding to the communicating hole 357 of the cam block 350 is formed; and slider adjusters 363 and 365 which are insertedly coupled in the communicating hole 357 and the through hole 315, in such a manner that one side of the slider adjusters is supported by the front side of the cam block 350, and the other side is supported by the rear side of the yoke plug 310 so as to adjust a radial directional position of the sliders 320.

Herein, the slider adjusters include: an adjusting bolt 363 which has one side end supported by the front side of the cam block 350 and the other side end protruding through the through hole 315; and an adjusting nut 365 which supports the rear side of the yoke plug 310 and is coupled with the other side end of the adjusting bolt 363.

In the second embodiment of the present invention, the support yoke 330 supports the rear surface of the rack bar 140 by being inserted in the cylinder 250 of the gear box 130, and the cam block 350 and the sliders 320 are coupled between the support yoke 330 and the yoke plug 310, and are supportedly coupled with the yoke plug 310 by the slider adjusters 363 and 365 adjusting a radial directional position of the sliders 320.

The cam block 350 supporting the rear side of the support yoke 330 has a front side surface closely contacting with the support yoke 330, and a rear side surface formed with a slant surface 353 having a concave or convex center portion, symmetrical to a central axis surface, so as to lead the below described radial direction movement of the sliders 320. In the cam block 350, the communicating hole 357 through which the below described adjusting bolt 363 of the slider adjusters is passed is formed.

At the front side of the sliders 320, the slant surfaces 327 are formed which correspond to the slant surface 353 of the cam block 350 in such a manner that they can slide in a radial direction. Also, the sliders are separately formed symmetrically to the central axis surface. With the separated surfaces, the elastic supports 323 are coupled which support the sliders 320 separated as described above in a radial direction.

Accordingly, the sliders 320a and 320b both-sidedly separately formed slide by an elastic force of the elastic supports 323, respectively, along the slant surface 353 of the cam block 350 in a radial direction while supporting the support yoke 330 in the front direction by increasing the distance between the yoke plug 310 and the support yoke 330.

In other words, when being subjected to a force by the elastic supports 323 in a radial direction, the separated sliders 320a and 320b slide toward the outer circumferential side along the slant surface 353 of the cam block 350 and at the same time push the cam block 350 in the front direction. This reduces free movement between the support yoke 330 and the rack bar 140.

In the separated surfaces of the sliders 320, radial-directional inside grooves 325, with which the elastic supports 323 are coupled, are formed. The elastic supports 323 are coupled with the inside grooves 325 without escape, while allowing a couple of separated sliders 320a and 320b to be slid along the slant surface of the support yoke 330 by applying an elastic force to the sliders 320a and 320b in a radial direction, that is, from the central axis to the outer circumferential direction.

The yoke plug 310 is coupled with the cylinder 250 of the gear box 130 while supporting the rear surface of the sliders 320 in the front direction. In the center of the yoke plug, the through hole 315 corresponding to the communicating hole 357 of the cam block 350 is formed, through which the adjusting bolt 363 is passed.

Meanwhile, the slider adjusters are coupled with each other in such a manner that the sliders 320 and the cam block 350 are supportedly coupled with the yoke plug 310. Herein, the slider adjusters are insertedly coupled in the communicating hole 357 of the sliders 320 and the through hole 315 of the yoke plug 310, in such a manner that one side of the adjusting bolt 363 is supported by the front side of the cam block 350 and the other side is supported by the rear side of the yoke plug 310 while adjusting a radial directional position of the sliders 320, and at the rear side of the yoke plug 310, the adjusting nut 365 is combined.

Accordingly, a head portion of the adjusting bolt 363 is supported by the front side of the cam block 350 while the adjusting bolt is inserted in the communicating hole 357 of the cam block 350 and the through hole 315 of the yoke plug 310. Then, when the adjusting nut 365 is fastened in the combining direction, the separated sliders 320 are slid in a radial direction while reaching the central axis along the slant surface 353 of the cam block 350, as shown at the left side of FIG. 7. Then, the state where the cam block 350, the sliders 320, and the yoke plug 310 are integratedly assembled is maintained, and these components can be easily assembled with the cylinder 250 of the gear box 130.

In a state where the cam block 350, the sliders 320, and the yoke plug 310, in a coupled state, are assembled with the gear box 130, when the adjusting nut is unfastened, as shown at the right of FIG. 7, the sliders 320 are subject to a force toward the outer circumferential direction by an elastic force of the elastic supports 323. Then, the sliders are slid along the slant surface 353 of the cam block 350 while pushing the cam block 350 in the front direction and closely contacting the support yoke 330 with the rack bar 140. Then, by the elastic force of the elastic supports 323, the free movement of the rack bar 140 is automatically adjusted.

Also, between the rear surface of the support yoke 330 and the front surface of the sliders 320, a yoke spring 340 is coupled which supports the support yoke 330 in the front direction while absorbing the external impact transferred through the rack bar 140.

Also, at the rear surface of the support yoke 330, a spring groove 333 in which the yoke spring 340 is inserted is formed, the spring groove being configured to fix the yoke spring 340 without escape.

Figure 8:
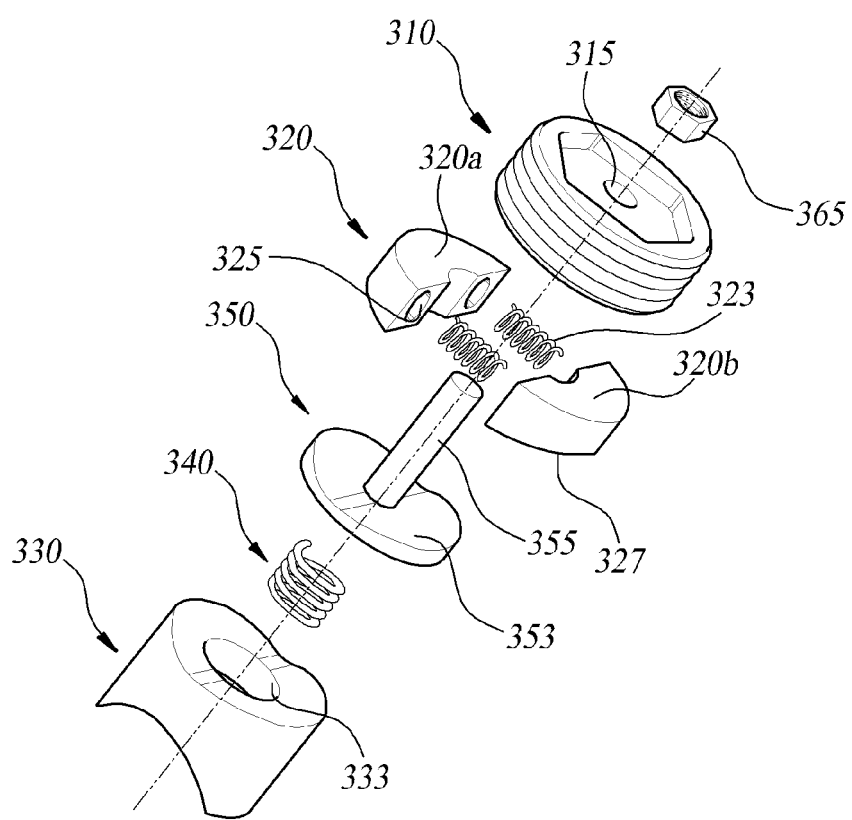
FIG. 8 is an exploded perspective view illustrating a rack bar supporting device for a vehicle, according to a third embodiment of the present invention.
Figure 9:
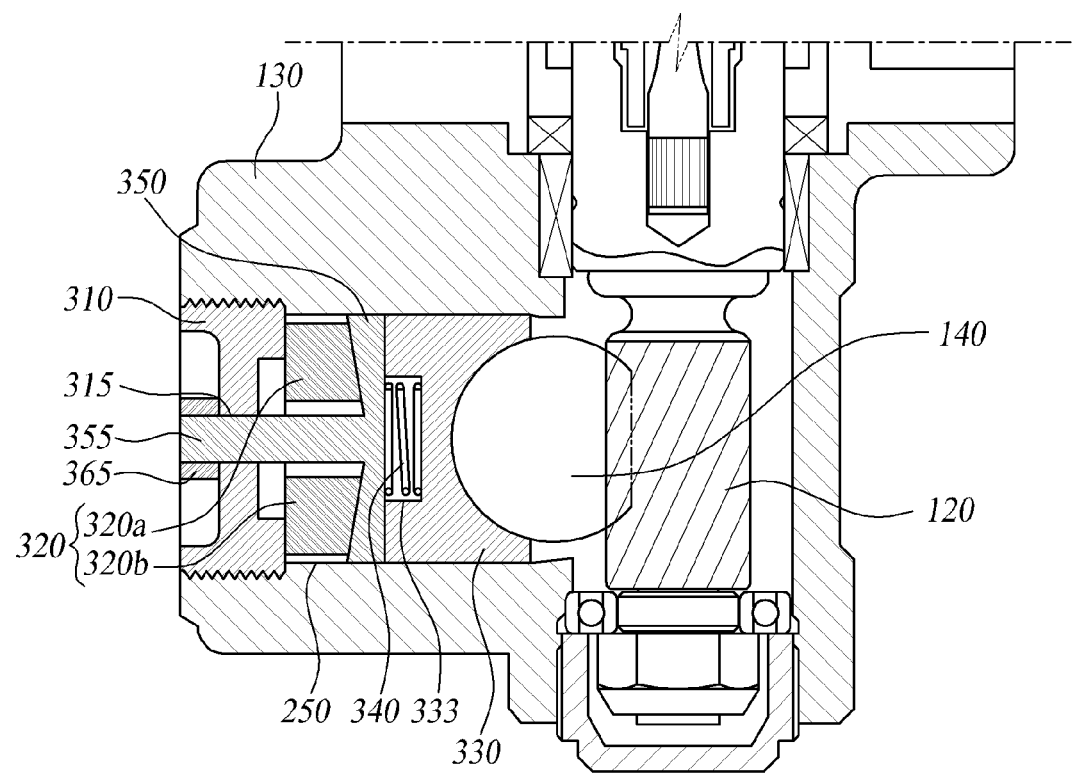
FIG. 9 is a cross-sectional view illustrating a rack bar supporting device for a vehicle, according to a third embodiment of the present invention.

FIG. 8 is an exploded perspective view illustrating a rack bar supporting device for a vehicle, according to a third embodiment of the present invention, and FIG. 9 is a cross-sectional view illustrating a rack bar supporting device for a vehicle, according to a third embodiment of the present invention.

As shown in FIGS. 8 and 9, a rack bar supporting device of a steering wheel for a vehicle, according to the third embodiment of the present invention includes: a support yoke 330 inserted in a cylinder 250 of a gear box 130, which has a front side surface closely supporting the rear surface of a rack bar 140; a cam block 350 having a front side surface closely contacting with the support yoke 330, and a rear side surface formed with a slant surface 353 symmetrical to a central axis surface, wherein in the center portion of the rear side surface of the cam block, an adjusting bolt 355 for adjusting a radial directional position of the below described sliders 320 is formed, the adjusting bolt being supported by the rear side surface of the below described yoke plug 310 and being coupled with an adjusting nut 365; sliders 320 formed with slant surfaces 327 corresponding to the slant surface 353 of the cam block 350 at the front side thereof, wherein the sliders are separately formed symmetrically to the central axis surface, and support the cam block 350 in the front direction by the elastic force of radial-directionally supporting elastic supports 323 coupled with the separate surfaces; and a yoke plug 310 coupled with the cylinder 250 of the gear box 130 to support the rear surfaces of the sliders 320 in the front direction, wherein in the center of the yoke plug, a through hole 315 is formed, in which the adjusting bolt 355 of the cam block 350 is inserted.

In the third embodiment of the present invention, the support yoke 330 supports the rear surface of the rack bar 140 by being inserted in the cylinder 250 of the gear box 130. Also, between the support yoke 330 and the yoke plug 310, the cam block 350 integratedly formed with the adjusting bolt 355, and the sliders 320 are supportedly coupled with the yoke plug 310, the adjusting bolt 355 being configured to adjust a radial directional position of the sliders 320.

In other words, the cam block 350 supporting the rear side of the support yoke 330 has a front side surface closely contacting with the support yoke 330, and a rear side surface formed with the slant surface 353 having a concave or convex center portion, symmetrical to a central axis surface. Also, in the center portion of the rear side surface, the adjusting bolt 355 is integratedly formed, so that the cam block 350 and the sliders 320 can be supported by the rear side surface of the yoke plug 310 and can be coupled with the adjusting nut 365.

Since the sliders 320 and the yoke plug 310 are the same as those in the second embodiment, the detailed description thereof will be omitted.

The adjusting bolt 355 is integratedly formed with the center portion of the rear side surface of the cam block 350. Thus, the adjusting bolt 355, which supportedly couples the cam block 350 and the sliders 320 with the yoke plug 310, is insertedly coupled with the through hole 315 of the yoke plug 310, and is fastened by the adjusting nut 365 at the rear side of the yoke plug 310.

Accordingly, when the adjusting bolt 355 is inserted in the through hole 315 of the yoke plug 310, and the adjusting nut 365 is fastened in the combining direction, the separated sliders 320a and 320b are slid in a radial direction while reaching the central axis along the slant surface 353 of the cam block 350. Then, the state where the cam block 350, the sliders 320, and the yoke plug 310 are integratedly assembled is maintained, and these components can be easily assembled with the cylinder 250 of the gear box 130.

Then, when the adjusting nut 365 is unfastened, the sliders 320 are subjected to a force toward the outer circumferential direction by an elastic force of the elastic supports 323. Then, the sliders are slid along the slant surface 353 of the cam block 350 while pushing the cam block 350 in the front direction and closely contacting the support yoke 330 with the rack bar 140. Thus, the free movement of the rack bar 140 is automatically adjusted.

Also, between the rear surface of the support yoke 330 and the front surface of the sliders 320, a yoke spring 340 is coupled which supports the support yoke 330 in the front direction while absorbing the external impact transferred through the rack bar 140.

Also, at the rear surface of the support yoke 330, a spring groove 333 in which the yoke spring 340 is inserted is formed, the spring groove being configured to fix the yoke spring 340 without escape.

Figure 10:
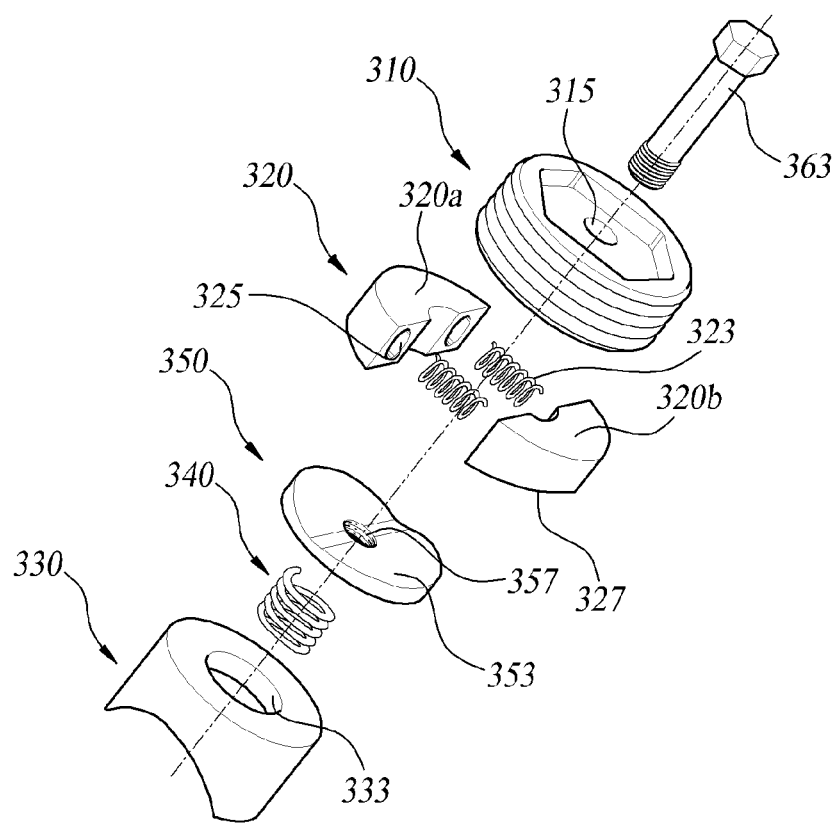
FIG. 10 is an exploded perspective view illustrating a rack bar supporting device for a vehicle, according to a fourth embodiment of the present invention.
Figure 11:
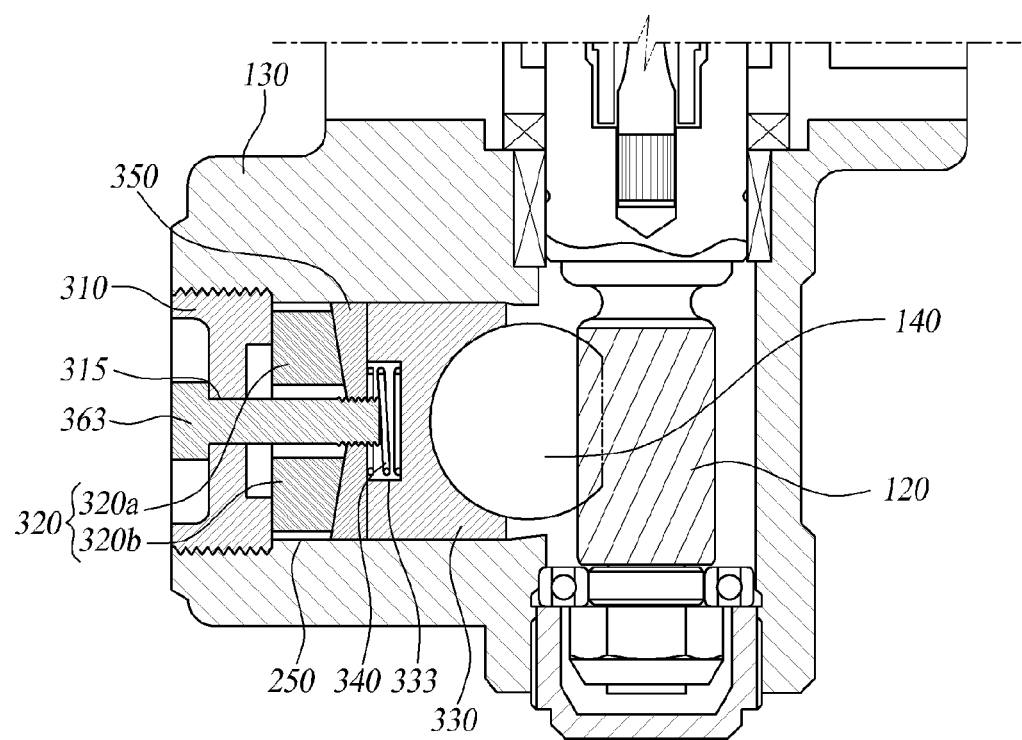
FIG. 11 is a cross-sectional view illustrating a rack bar supporting device for a vehicle, according to a fourth embodiment of the present invention.

FIG. 10 is an exploded perspective view illustrating a rack bar supporting device for a vehicle, according to a fourth embodiment of the present invention, and FIG. 11 is a cross-sectional view illustrating a rack bar supporting device for a vehicle, according to a fourth embodiment of the present invention.

As shown in FIGS. 10 and 11, a rack bar supporting device for a vehicle, according to the fourth embodiment of the present invention includes: a support yoke 330 inserted in a cylinder 250 of a gear box 130, which has a front side surface closely supporting the rear surface of a rack bar 140; a cam block 350 having a front side surface closely contacting with the support yoke 330, and a rear side surface formed with a slant surface 353 symmetrical to a central axis surface, wherein in the center portion of the cam block, a communicating hole 357 formed with a screw part is formed; sliders 320 formed with slant surfaces 327 corresponding to the slant surface 353 of the cam block 350 at the front side thereof, wherein the sliders are separately formed symmetrically to the central axis surface, and support the cam block 350 in the front direction by the elastic force of radial-directionally supporting elastic supports 323 coupled with the separate surfaces; a yoke plug 310 coupled with the cylinder 250 of the gear box 130 to support the rear surfaces of the sliders 320 in the front direction, wherein in the center of the yoke plug, a through hole 315 is formed; and an adjusting bolt 363 which supports the rear side surface of the yoke plug 310 while being screw-coupled with the communicating hole 357 of the cam block through the through hole 315.

The device according to the fourth embodiment is the same as that of the second embodiment, except that the communicating hole 357 of the cam block 350 is formed with a screw part, and the adjusting bolt 363 is screw-coupled with the communicating hole 357 in such a manner that the sliders 320 and the cam block 350 are supportedly coupled with the yoke plug 310. Thus, only different aspects will be described.

In the fourth embodiment of the present invention, a head portion of the adjusting bolt 363 is supported by the rear side of the yoke plug 310 while the adjusting bolt can adjust the radial directional position of the sliders 320 by being screw-coupled with the through hole 315 of the yoke plug 310 and the communicating hole 357 of the cam block 350.

Accordingly, when the adjusting bolt 363 is fastened in the communicating hole 357 in the combining direction, the separated sliders 320 are slid in a radial direction while reaching the central axis along the slant surface 353 of the cam block 350. Then, the state where the cam block 350, the sliders 320, and the yoke plug 310 are integratedly assembled is maintained, and these components can be easily assembled with the cylinder 250 of the gear box 130.

In a state where the cam block 350, the sliders 320, and the yoke plug 310, in a coupled state, are assembled with the gear box 130, when the adjusting bolt 363 is unfastened, the sliders 320 are subjected to a force toward the outer circumferential direction by an elastic force of the elastic supports 323. Then, the sliders are slid along the slant surface 353 of the cam block 350 while pushing the cam block 350 in the front direction and closely contacting the support yoke 330 with the rack bar 140. Then, by the elastic force of the elastic supports 323, the free movement of the rack bar 140 is automatically adjusted.

Also, between the rear surface of the support yoke 330 and the front surface of the cam block 350, a yoke spring 340 is coupled which supports the support yoke 330 in the front direction while absorbing the external impact transferred through the rack bar 140.

Also, at the rear surface of the support yoke 330, a spring groove 333 in which the yoke spring 340 is inserted is formed, the spring groove being configured to fix the yoke spring 340 without escape.

The device with the above described configuration and shape, according to the present invention, can prevent free movement from increasing by automatically adjusting a predetermined free movement even when wear occurs in a support yoke after degradation of driving durability of a vehicle. Also, it is possible to prevent a noise from occurring caused by an increase of free movement when the support yoke collides with a yoke plug by an impact reversely input from an uneven road surface, etc. This provides a comfortable steering feeling to the driver.

Even though it was described above that all of the components of an embodiment of the present invention are coupled as a single unit or coupled and operated as a single unit, the present invention is not limited to such an embodiment. That is, within the purpose of the present invention, all of the components may be selectively coupled and operated as one or more units.

In addition, since terms, such as "including," "comprising," and "having" mean that one or more corresponding components may exist unless they are specifically described to the contrary, it shall be construed that one or more other components can be included rather than excluded.

Although a technical scope of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A rack bar supporting device of a steering apparatus for a vehicle, the rack bar supporting device comprising:

a support yoke inserted in a cylinder of a gear box, which has a front side surface closely supporting a rear surface of a rack bar;

a cam block having a communicating hole formed in a center thereof, which has a front side surface closely contacting with the support yoke, and a rear side surface formed with slant surfaces symmetrical to a central axis surface;

sliders formed with slant surfaces corresponding to the slant surfaces of the cam block at a front side of the sliders, wherein the sliders are separately formed symmetrically to the central axis surface, the sliders have inside grooves formed at separated surfaces of the sliders, the inside grooves are coupled with elastic supports, and the sliders are movable along the slant surfaces of the cam block by an elastic force of the elastic supports applied in a direction that is from a central axis to an outer circumference so as to support the cam block in a front direction;

a yoke plug coupled with the cylinder of the gear box to support rear surfaces of the sliders in the front direction, in which in a center of the yoke plug, a through hole corresponding to the communicating hole of the cam block is formed;

a slider adjuster which is insertedly coupled in the communicating hole and the through hole, in such a manner that one side of the slider adjuster is supported by a front side of the cam block, and the other side is supported by a rear side of the yoke plug so as to adjust a radial directional position of the sliders.

2. The rack bar supporting device of the steering apparatus for the vehicle as claimed in claim 1, wherein the slider adjuster comprises: an adjusting bolt which has one side end supported by the front side of the cam block and the other side end protruding through the through hole; and an adjusting nut which supports the rear side of the yoke plug and is coupled with the other side end of the adjusting bolt.

3. The rack bar supporting device of the steering apparatus for the vehicle as claimed in claim 1, further comprising a yoke spring which is coupled between a rear side surface of the support yoke and the front side surface of the cam block so as to support the support yoke in the front direction.

4. The rack bar supporting device of the steering apparatus for the vehicle as claimed in claim 3, wherein at a rear surface of the support yoke, a spring groove in which the yoke spring is inserted is formed.

* * * * *